United States Patent
Varga et al.

(10) Patent No.: US 10,649,195 B2
(45) Date of Patent: May 12, 2020

(54) CONFOCAL SLIDE-DIGITIZING APPARATUS

(71) Applicant: 3DHISTECH KFT., Budapest (HU)

(72) Inventors: Viktor Sebestyén Varga, Budapest (HU); Béla Molnár, Budapest (HU); Gergely Kovách, Budakalász (HU); Dániel Luczi, Zalaegerszeg (HU)

(73) Assignee: 3DHISTECH KFT., Budapest (HU)

( * ) Notice: Subject to any disclaimer, the term of this patent is extended or adjusted under 35 U.S.C. 154(b) by 0 days.

(21) Appl. No.: 15/756,370

(22) PCT Filed: Aug. 31, 2016

(86) PCT No.: PCT/HU2016/050039
§ 371 (c)(1),
(2) Date: Feb. 28, 2018

(87) PCT Pub. No.: WO2017/037486
PCT Pub. Date: Mar. 9, 2017

(65) Prior Publication Data
US 2019/0025566 A1    Jan. 24, 2019

(30) Foreign Application Priority Data

Aug. 31, 2015 (HU) ..................... 1500394

(51) Int. Cl.
*G02B 21/36* (2006.01)
*G02B 21/26* (2006.01)
(Continued)

(52) U.S. Cl.
CPC ......... *G02B 21/362* (2013.01); *G02B 21/008* (2013.01); *G02B 21/0028* (2013.01);
(Continued)

(58) Field of Classification Search
None
See application file for complete search history.

(56) References Cited

U.S. PATENT DOCUMENTS 4,453,807 A * 6/1984 Faulkner ............... G02B 21/34
                                                            356/244
6,144,489 A   11/2000 Wilson et al.
(Continued)

FOREIGN PATENT DOCUMENTS

EP        1865354      12/2007
WO     2008149169      12/2008
(Continued)

OTHER PUBLICATIONS

International Search Report for PCT/HU2016/050039, dated Feb. 8, 2017; 6 pages.
(Continued)

*Primary Examiner* — Sath V Perungavoor
*Assistant Examiner* — Tyler B Edwards
(74) *Attorney, Agent, or Firm* — Fitch, Even, Tabin & Flannery LLP

(57) ABSTRACT

A confocal slide-digitizing apparatus (100) includes a slide handling unit (20) and an imaging unit (10), wherein the slide handling unit (20) has a slide supplier unit (90). The imaging unit (10) has a light source (40) to illuminate the sample to be digitized at the imaging position through an objective (18) arranged in a light path that enables confocal imaging of at least a region of the sample and an image recording unit to receive light with information on at least an illuminated region of the sample through the objective (18) and generate a digital image of a section of a given thickness of said illuminated region. Moreover, said slide handling unit (20) and said imaging unit (10) are joined mechanically
(Continued)

together in a tiltable manner relative to one another, thereby correcting the light path of said confocal imaging.

15 Claims, 6 Drawing Sheets

(51) Int. Cl.
  *G02B 21/00*    (2006.01)
  *G02B 21/33*    (2006.01)
  *G02B 21/24*    (2006.01)
  *H04N 5/225*    (2006.01)

(52) U.S. Cl.
  CPC ..... *G02B 21/0036* (2013.01); *G02B 21/0076* (2013.01); *G02B 21/24* (2013.01); *G02B 21/26* (2013.01); *G02B 21/33* (2013.01); *G02B 21/361* (2013.01); *G02B 21/367* (2013.01); *H04N 5/2253* (2013.01)

(56) References Cited

U.S. PATENT DOCUMENTS

| | | | |
|---|---|---|---|
| 6,687,052 B1 | 2/2004 | Wilson et al. | |
| 9,575,308 B2 * | 2/2017 | Dixon | G02B 21/26 |
| 2005/0248839 A1 * | 11/2005 | Yamaguchi | G02B 21/16 |
| | | | 359/385 |
| 2014/0184780 A1 * | 7/2014 | Abe | G02B 21/367 |
| | | | 348/80 |
| 2015/0264270 A1 * | 9/2015 | Watanabe | G02B 21/365 |
| | | | 348/79 |
| 2016/0069919 A1 * | 3/2016 | Holmes | G01N 21/07 |
| | | | 506/2 |

FOREIGN PATENT DOCUMENTS

| | | |
|---|---|---|
| WO | 2013046649 | 4/2013 |
| WO | 2013138911 | 9/2013 |
| WO | 2014087713 | 6/2014 |

OTHER PUBLICATIONS

Written Opinion of the International Searching Authority for PCT/HU2016/050039, dated Feb. 8, 2017; 12 pages.

Notification of International Preliminary Report on Patentability for PCT/HU2016/050039, completed Jan. 17, 2018; 14 pages.

* cited by examiner

CONFOCAL SLIDE-DIGITIZING APPARATUS

CROSS REFERENCE TO RELATED APPLICATIONS

This patent application is the national phase of PCT/HU2016/050039 filed Aug. 31, 2016, which claims the benefit of Hungarian Patent Application No. P1500394 filed Aug. 31, 2015.

TECHNICAL FIELD

The present invention relates to an apparatus for generating a digital copy of a slide carrying a biological sample. In particular, the present invention relates to an apparatus performing optical scanning, i.e. a slide-digitizing apparatus, which is used for recording a digital image of a section of desired thickness of a biological sample as a whole or in a given region thereof by means of confocal optical imaging, the sample being arranged on a conventional slide and preferably comprising fluorescent markers as well.

BACKGROUND

When generating a digital copy of a slide, i.e. when it is digitized, the image of the slide is generated from image field to image field through a step by step movement of the slide or the camera relative to each other. As a result of the operation, a series of frames is obtained in digital format, wherein each frame corresponds to a respective image field. To create a complete digital image of the slide, the thus obtained frames are stitched together. As the extension of the image fields is generally a few µm in each spatial direction, it takes a significant amount of time to generate a digital copy of the whole slide.

Confocal imaging provides a peculiar modality of optical microscopy that is capable of separating focused and non-focused beams in the light path of the microscope by physical and/or optical techniques. This enables the possibility of studying such sections/samples, the thicknesses of which significantly exceed the depth of focus or operation range of the objective.

Several principles are known for the technical implementation, however, it is an inherent feature of all forms of implementation that they lead to a decrease in light intensity. When fluorescent markers widely applied in routine diagnostics are used, this forms a serious limiting factor, because the emission of such fluorescent markers is only a fraction of the intensity of the exciting light. Thus, to keep the amount of time required for the complete digitization of a slide within acceptable limits, special technical solutions should be applied.

U.S. Pat. Nos. 6,144,489 and 6,687,052 disclose a variant of said technical implementation: confocal microscopy based on the principle of so-called structured illumination. The core feature of this technique is that the sample arranged on the slide under study is illuminated through a light modulation mask, and then the light reflected by the sample is simultaneously imaged as both passing through the mask and as reflected from the same light modulation mask. A sharp confocal image free of blurred background is obtained by subtracting the image of reflected light from the image of transmitted light.

An advantage of confocal microscopes based on the principle of said structured illumination is that they have the highest achievable light-utilization/confocality index among techniques known nowadays, which makes them particularly suitable for examination of fluorescently marked samples.

As confocal imaging based on structured illumination is, according to the aforementioned, based on the comparison of an image reflected from the mask and one transmitted through it, a confocal unit operating on this principle records optical sample sections tilted relative to the examined slide due to the distorting effect of the mask on the light path. This does not pose a problem in conventional microscopy, because subsequent tilted images still create a spatial (3D) image, fitting/stitching together multiple frames recorded next to each other does not pose significant difficulty. However when digitization is carried out to generate a complete image of the slide, the edges of the images next to each other do not match in Z direction, thus the recorded images cannot be continuously fitted to each other.

SUMMARY

An object of the present invention is to eliminate this problem, i.e. to provide a slide-digitization apparatus that is intended for recording a complete image of a slide on a slice by slice basis with using confocal imaging based on the principle of structured illumination. In particular, the object of the invention is to provide an apparatus for generating clear, background-free 3D images of relatively thick (in Z direction) biological (particularly histological) sections/samples arranged on a slide by the method of "optical slicing". Here, and from now on, the term "thick sample" refers to a sample having a thickness of at least 4 µm, preferably at least 5 µm (possibly even larger, even several hundred microns).

In modern diagnostics, the examined samples are often fluorescently marked, which allows selective exposition and examination of different parts of the sample. As the intensity of light emitted by the dyes used for fluorescent marking is only a fraction of the intensity of illumination emitted by the light source exciting the fluorescent markers, recording of images with sufficient contrast is usually carried out by using quite strong exciting illumination for a relatively long time period. As the fluorescent markers exponentially lose their emission intensity by the increase of excitation intensity and time, such illumination generally provided by a laser source is disadvantageous for the sample comprising fluorescent markings, because it results in premature deterioration (i.e. "burn-out") of the sample, which is practically equivalent to rendering the sample unusable.

Keeping this in sight, a further object of the invention is to provide a slide-digitizing apparatus operating with structured illumination, which uses an illumination that is gentle with the fluorescent markers, and thus ensures longevity of the fluorescently marked samples.

In order to reduce exposition time and to increase resolution in fluorescent microscopy, generally objectives having large numeric aperture are used. The best possible optical resolution may be achieved, if the difference between the refractive indices of the lens and the slide on the light path of the light entering the microscope is as low as possible. To this end, usually, as is well known, immersion liquids are used, which are dropped into that region of the sample on the slide which is currently under study. As the histological sections may be created by different methods (paraffinic, frozen), different types of immersion liquids are optimal for different samples. The use of immersion liquids may also increase the amount of light that can be collected by the objective from the emission of fluorescent markers and thus the amount of light available for imaging, thus immersion liquid is practically present between the slide and the objective in the propagation direction of light during the entire period of examination/digitization. As creating a complete image of a single slide may take several, even 4 to 6 hours, a continuous supply of immersion liquid has to be provided.

Accordingly, a further object of the present invention is to provide a slide-digitizing apparatus operating with structured illumination, that is suitable to use different immersion liquids, provides an easy method of switching between different immersion liquids and supply of the immersion fluid in use.

As mentioned before, generating a complete digital copy of a single slide is a long process requiring significant amount of time. The main reason of this is that confocal imaging requires significantly longer exposition times, than fluorescent (wide-field FL) imaging. Therefore the exact localization of the sample on the slide and skipping the digitization of "empty" or uninteresting regions is imperative to increase the slide digitization speed.

In case of carrying out multichannel digitization, subsequent recording of different channels may present a further difficulty, which is carried out by inserting and removing suitable filtering elements to and from the light path. The time period for switching the filters is considered an idle time regarding the imaging which significantly increases the time required for digitizing a slide due to the large number (several ten thousands or even 100 000) of necessary switches during the creation of a complete image of a slide.

Accordingly a further object of the present invention is to provide a slide-digitizing apparatus operating with structured illumination, that is suitable for carrying out complete digitization of a slide (i.e. generating a digital copy thereof) in a time shorter than required by slide-digitizing apparatuses available nowadays.

A significant disadvantage of large microscopes used in diagnostics practice nowadays is their large physical dimensions and thus the complications involved in relocation thereof. A further disadvantage of large microscopes is that they have to be subjected to a prescribed start-up/installation protocol before starting their operation at the new location.

Consequently, an object of the present invention is to provide a slide-digitizing apparatus operating with structured illumination, which has a compact configuration on the one hand, and on the other hand it can be easily redeployed from one place to another without being detuned or damaged.

Finally, a further object of the invention is to provide a slide-digitizing apparatus operating with structured illumination, which is suitable for simultaneous transmitted light or 'bright-field', confocal and fluorescent imaging of the sample on the slide.

In our studies we have came to the conclusion, that confocal imaging based on structured illumination can be made suitable for generating digital images of thick samples as a whole arranged on slides. With other words, optical slicing of a thick sample carried out by a confocal imaging unit based on structured illumination is suitable for recording images of adjacent sections in such manner that said images may be continuously fitted to each other in a subsequent (e.g. processing) step. To this end, for the recording of subsequent images the imaging unit has to be positioned in a position tilted in a certain angle relative to an axis perpendicular to the image plane of the device used for image recording. As the size of said tilting angle is also dependent on the magnification provided by the actually used objective, and due to the fact that leaning of the light modulating unit used in the light path in the case of structured illumination appears on the image in a magnified manner, when the objective is switched (i.e. the magnification is changed), modification of the tilting angle for compensating image distortions created by the leaning of said light modulation element, i.e. correction of the light path also becomes necessary.

The aforementioned objects and other obvious objects made clear in the detailed description of the invention are achieved by providing a confocal slide-digitizing apparatus according to claim 1. Preferred embodiments of the apparatus according to the invention are set forth in claims 2 to 15.

In particular, the confocal imaging unit of the confocal slide-digitizing apparatus according to the invention, and the slide handling unit thereof that handles the slide(s) (thus moving and/or supplying, positioning it/them e.g. in a known manner) are joined together by an interposed tilting mechanism, whose tilt axis is on the focal plane of the objective of the imaging unit. Here, and from now on tilt axis of the tilting mechanism is meant as the axis around which the imaging unit is positioned by rotation with the required tilting angle for recording the image of each section of the sample; said tilting angle is perpendicular to the optical axis of the imaging unit. The tilting angle may substantially be adjusted arbitrary and in a quasi-continuous manner (i.e. in very small steps) between given limits—in an angular range of $\pm 15°$, preferably $\pm 10°$, more preferably $\pm 5°$ relative to vertical (preferably Z direction). The operation of the tilting mechanism, i.e. the adjustment of the tilting angle is preferably carried out by a stepper motor, preferably in an automated manner. The step size used when adjusting the tilting angle is determined by the increment (angular displacement) of the stepper motor. The tilting angle may also be adjusted manually. The suitable adjustment of the tilting angle compensates the distortion of the light path created by the inclination of the light modulating element.

The required tilting angle is practically determined on the basis of geometry of the system and the known magnification of the objective of the imaging unit. Accordingly, during the setup/calibration carried out when commissioning the digitizing apparatus according to the invention, different required tilting angles may be set for different objectives, and when switching objectives, the tilting angle corresponding to the desired objective to be used for the imaging is automatically adjusted by the automated operation of the tilting mechanism. It is hereby noted, that the setup/calibration is carried out on the basis of images recorded by the digitizing apparatus by determining if the same overlapping portions of two adjacent fields of view look the same for different tilting angles.

BRIEF DESCRIPTION OF THE DRAWINGS

In what follows, the invention is described in detail with reference to the accompanying drawings, wherein.

DETAILED DESCRIPTION OF THE DRAWINGS

Figure 1:
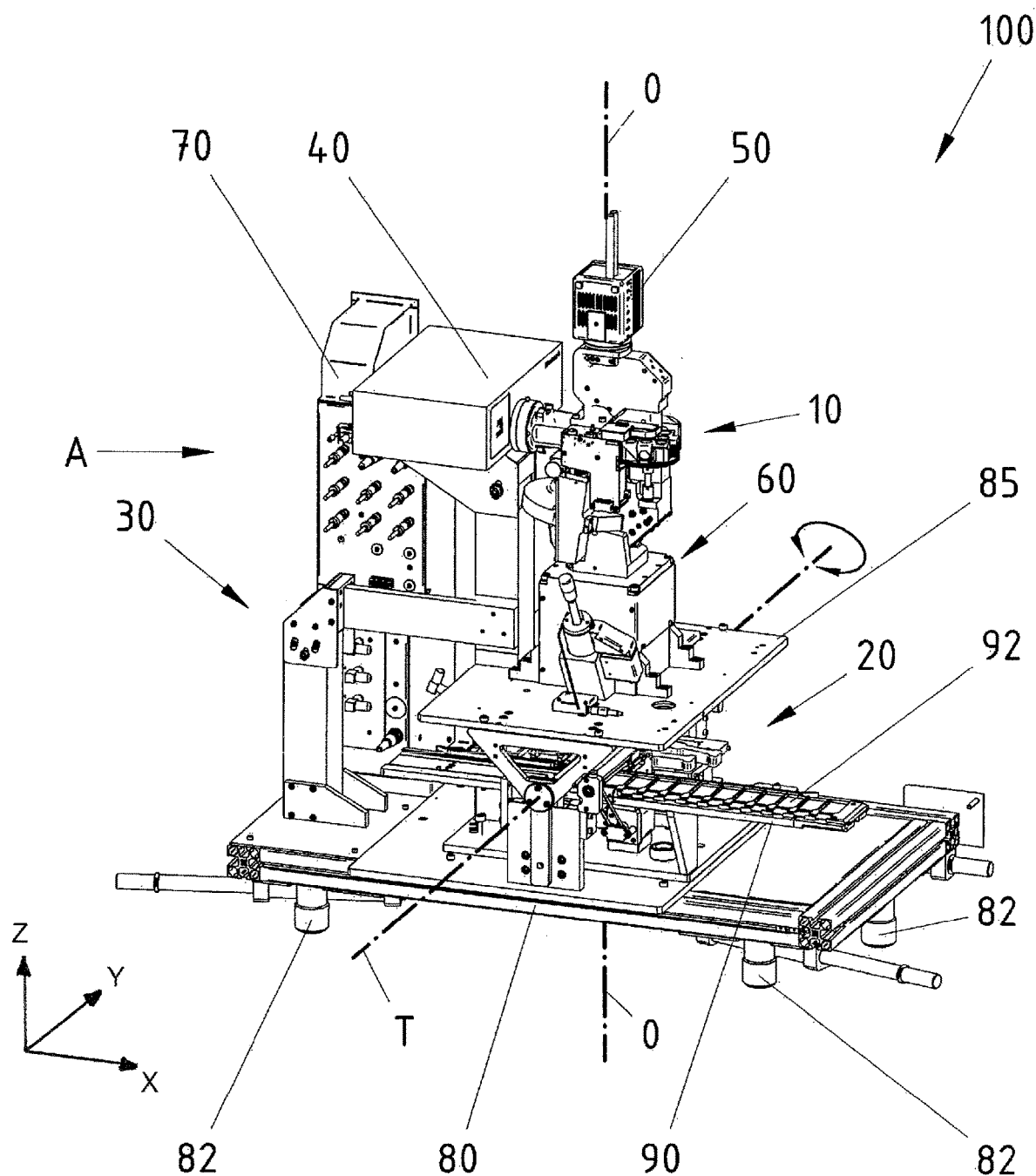
FIG. 1 is a perspective view of an exemplary embodiment of the slide-digitizing apparatus operating on the principle of confocal imaging according to the invention.
Figure 2:
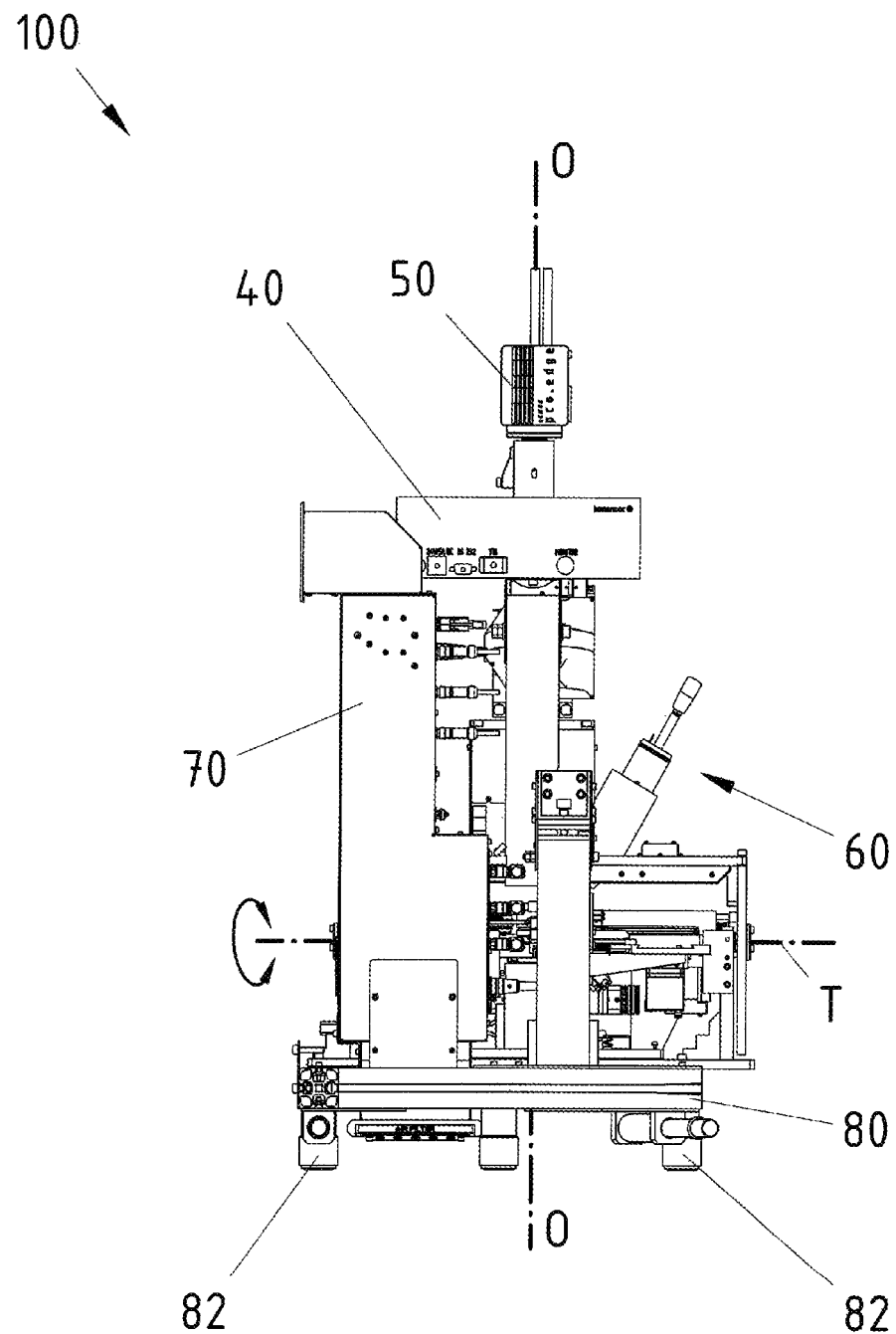
FIG. 2 is a view of the slide-digitizing apparatus according to FIG. 1 shown from the direction indicated by the arrow A in FIG. 1.

FIGS. 1 and 2 show a preferred exemplary embodiment of the confocal slide-digitizing apparatus 100 according to the invention, FIG. 1 in perspective view, and FIG. 2 in a view as seen from the direction of arrow A shown in FIG. 1. The digitizing apparatus 100 is used for generating digital 3D image (from now on: image) of the whole of or one or more interesting sub-regions of a thick biological (e.g. histological) sample, i.e. a sample of at least 4 µm thickness arranged on a slide 92 by optical slicing; the digitizing apparatus 100 can also be used for recording images of thinner samples. The sample subjected to the imaging preferably comprises fluorescent markers; the digitizing apparatus 100 can also be used for imaging samples without fluorescent markers.

Figure 11:
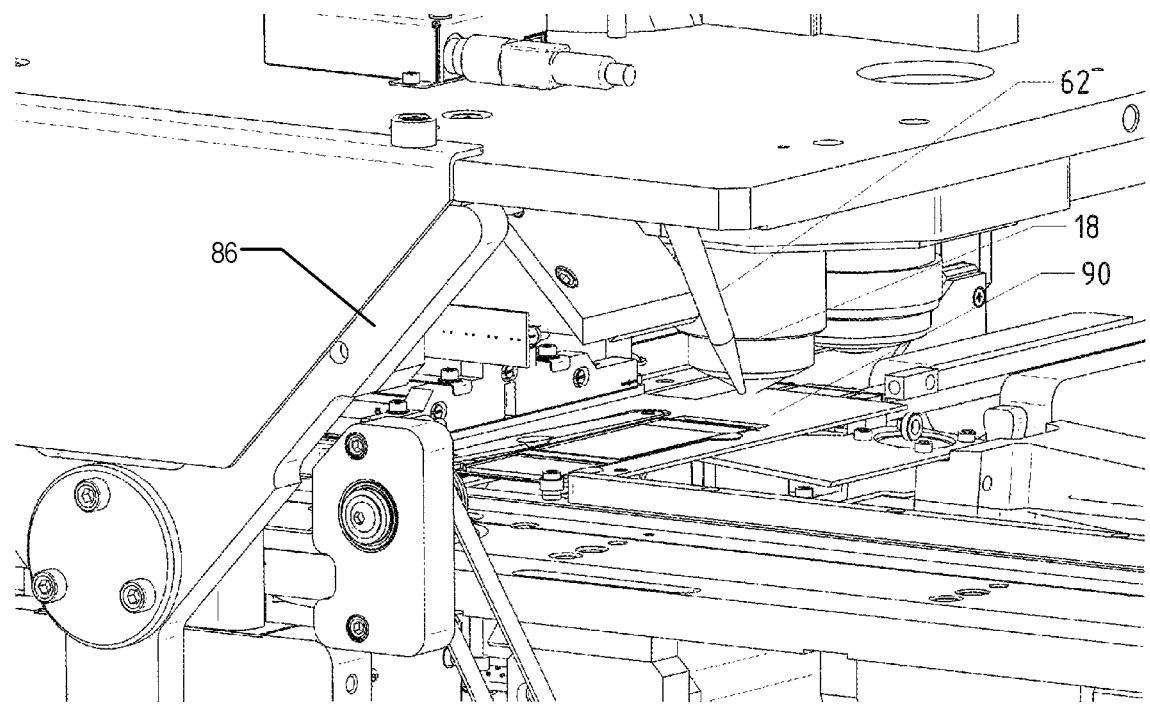
FIG. 11 illustrates the pipetting unit shown in FIG. 10 in a position mounted into the slide-digitizing apparatus according to the invention.

As can be seen in FIGS. 1 and 2, the confocal slide-digitizing apparatus 100 comprises—regarding its main component—a confocal imaging unit 10 determining an optical axis O, a conventional slide handling unit 20 joined mechanically thereto, a light source 40 for illuminating the sample arranged on the slide 92, preferably a high speed and/or high resolution image recording apparatus provided in the form of a camera 50, and an electronic and control unit 70. Here, the optical axis O of the imaging unit 10 is preferably parallel to the direction perpendicular to the image recording surface of the camera 50, i.e. the image plane, but this is not necessary. The imaging unit 10 and the slide handling unit 20 are joined together by the tilting mechanism 30. The function of the tilting mechanism 30 is to provide tiltability of the imaging unit 10 and the slide handling unit 20 relative to each other, and thus ensuring the continuous fitting along a vertical axis of images of two adjacent sections of the sample in a manner to be described in detail in the following by correcting the light path of light propagating in the imaging unit 10 used for imaging. The light source 40 and the camera 50 are optically coupled with the imaging unit 10. As a result, illuminating light emitted by the light source 40 enters the imaging unit 10 and passes to the region of the sample on the slide 92 selected to be imaged through the objective 18 (see FIG. 11) of the imaging unit 10 in an unobstructed manner, and then light reflected/emitted by this region carrying useful information for the imaging passes through said objective 18 to the camera 50. The power supply of the digitizing apparatus 100 and of its components, and the control required for operation are provided by the electronic and control unit 70 through electric and/or data communication connections preferably formed as wiring to each component. Said data communication connection may also be provided in the form of wireless connection. In a preferred embodiment of the digitizing apparatus 100, it is equipped with a pipetting unit 60, whose function is the wetting of the immersion objective preferably used in the imaging unit 10 continuously as required.

The light source 40 is preferably a fluorescent light source comprising one or more light emitting diodes (LEDs) as light emitting elements. Preferably more than one, preferably six LEDs that emit light at different wavelengths/wavelength ranges are arranged in the light source 40, thus the sample arranged on the slide 92 may be simultaneously illuminated by the imaging unit 10 at multiple wavelengths (multichannel digitizing). As a result, the image of the given region of the sample may be recorded simultaneously at multiple wavelengths, in particular fluorescent markers that emit light at different wavelengths may be used for imaging (selectivity). Thus different details of the sample may be recorded in a single step. Another advantage of using LEDs is that the strong illumination (high light intensity) provided thereby, which is particularly advantageous when using fluorescent markers in the sample, because it increases the excitation of the fluorescent markers and thus the intensity and detectability of fluorescent light emitted thereby carrying information about the sample. A further advantage of configuring the light source 40 as a LED light source is that this way the digitizing apparatus 100 does not contain 'aging' components (like a laser providing illumination), which would require recalibration and/or replacement from time to time. This clearly results in the increase of the life cycle of the confocal slide-digitizing apparatus 100 and simplifies its maintenance. Furthermore, as the LEDs used in the light source 40 can be turned on/off relatively quickly (compared to lasers), in the case of the digitizing apparatus 100 the light source 40 illuminates the sample only during subsequent expositions, but not between two expositions. This way sample and the fluorescent markers of the sample are subjected to exiting light only during expositions, and thus their light load and thus their 'burn-out' is reduced.

The camera 50 which is the imaging unit of the digitizing apparatus 100 is preferably a camera with active cooling and is equipped with a 16-bit sCMOS chip (e.g. a member of the PCO.edge series; manufacturer: PCO company, Kelheim, Germany). The digitizing apparatus 100 according to the invention with such an image recording unit is suitable for substantially noise-free recording of low intensity signals (e.g. light emitted by the fluorescent markings), thus its use allows efficient digitization of slides with sufficient resolution.

It should be here noted, that the light source 40 and the camera 50 are in direct connection by simple electric control for the further reduction of the light exposure of the sample and its fluorescent markings: switching on/off of the light source 40 is carried out directly by the camera 50 itself in a hardware-implemented manner when the exposition starts and ends. This way illumination of the sample for exposition does not require allowances for software delays, i.e. the 'burn-out' of fluorescent markers during the digitization of the sample in the case of the digitizing apparatus 100 is significantly reduced, because they are excited only during the actual exposition time.

A basic unit of the digitizing apparatus 100 is a conventional slide-handling unit 20 known by a person skilled in the art, comprising a slide supplier unit 90 for receiving, handling, such as loading, transporting to an image recording/digitizing position and positioning therein of one or more slides 92. The slide handling unit 20 is preferably mounted on a table 80, which table 80 is made of a vibration absorbing/dampening material, preferably rubber, and rests on one or more legs 82 or brackets. In the embodiment of the digitizing apparatus 100 shown in FIGS. 1 and 2, the slide supplier unit 90 is a so-called horizontal slide supplier unit, wherein the slide 92 is arranged and transported to the digitization position—where the slide 92 is in horizontal orientation, i.e. it lies in the XY plane—in a horizontal orientation, i.e. parallel with the plane of the table (i.e. with the XY plane, see FIG. 1). The digitizing apparatus 100 according to the invention may also be implemented with a different slide supplier unit. In such a case, one or more suitable auxiliary units help with bringing the slides into the horizontal position for image recording.

The imaging unit 10 generates an image of the whole or of one or more regions of interest of the sample on the slide 92 by structured illumination. The imaging unit 10 is arranged above the slide handling unit in such manner, that its optical axis O is substantially perpendicular to the slide 92 and the sample thereon to be imaged in the normal position of the imaging unit 10. This means that in the normal position of the imaging unit 10 the optical axis O coincides with the Z direction representing the vertical. The imaging unit 10 provides a continuous light path for the illuminating light beam from the light source 40 to the objective 18 (shown in FIG. 11) of the imaging unit 10 (i.e. actually to the sample on the slide 92), and for the light beams used for confocal imaging from the objective 18 (i.e. actually from the sample on the slide 92) to the camera 50 connected to the imaging unit 10, more exactly to the image recording region of the image recording element of the camera 50 (e.g. to a light detecting surface of said sCMOS chip or charge coupled device (CCD)). Further details of said light path that is continuous and tiltable relative to the vertical can be seen in FIG. 3 that illustrates a preferred exemplary embodiment of the imaging unit 10.

Figure 3:
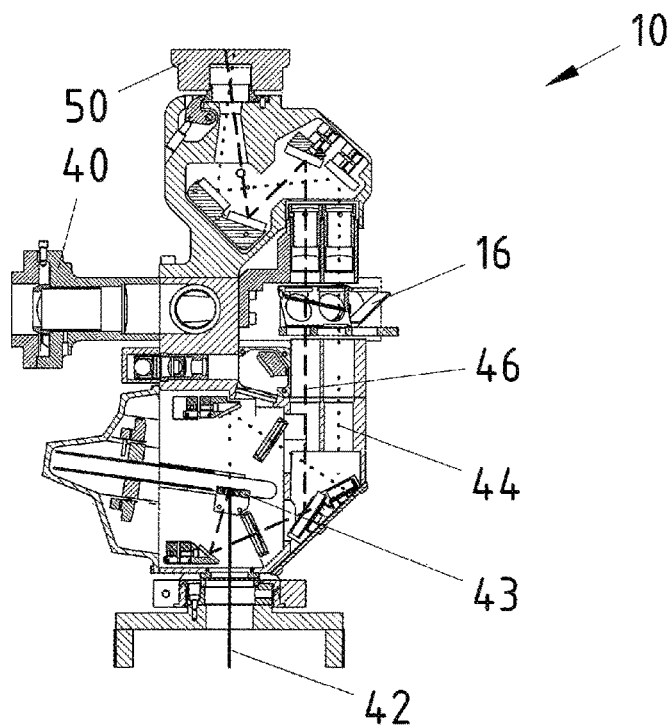
FIG. 3 is the longitudinal section of an exemplary embodiment of the confocal unit, which constitute a major component of the slide-digitizing apparatus according to the invention.

FIG. 3 schematically illustrates the generation of a confocal image. To this end—as it is known to a person skilled in the art—the light beam 42 reflected/emitted by the sample (not shown in FIG. 3) is guided to light modulating element 43, which is inclined, i.e. its plane forms an angle with the plane of the slide to be digitized. The light modulating element 43 divides the light beam 42 into two partial beams 44, 46: the first partial beam 44 transmitted thereby and the second partial beam 46 reflected thereby, which are then guided to the image recording element of the camera 50 along two different light paths by suitable optical elements (mirrors and one or more reflecting surfaces oriented in suitable angles). In this case, the partial beam 44 carries information required for imaging the region of the sample to be imaged sharply by the objective 18 (see FIG. 11), while partial beam 46 carries information required for imaging the region of the sample to be imaged blurry by the objective 18. The confocal image is generated by a suitable combination of partial beams 44, 46 in the camera 50. A further advantage of the described configuration of the imaging unit 10 is that—besides the confocal imaging of the sample—it is also suitable for imaging the sample with transmitted light.

As it is known to a person skilled in the art, imaging the whole sample (i.e. the whole slide) or imaging the one or more interesting regions thereof is carried out on a frame by frame basis, i.e. by scanning the objective 18 (see FIG. 11) from field of view to field of view. Scanning is carried out in practice by moving the objective 18 and the slide 92 relative to each other. This relative movement is preferably provided by stepper motors suitable to move the slide 92 in the XY plane, i.e. in a plane perpendicular to the Z direction. A particular implementation of scanning performed on a field of view basis forms part of the prior art and is known from e.g. numerous patent documents, thus it is not described here in more detail.

Figure 4:
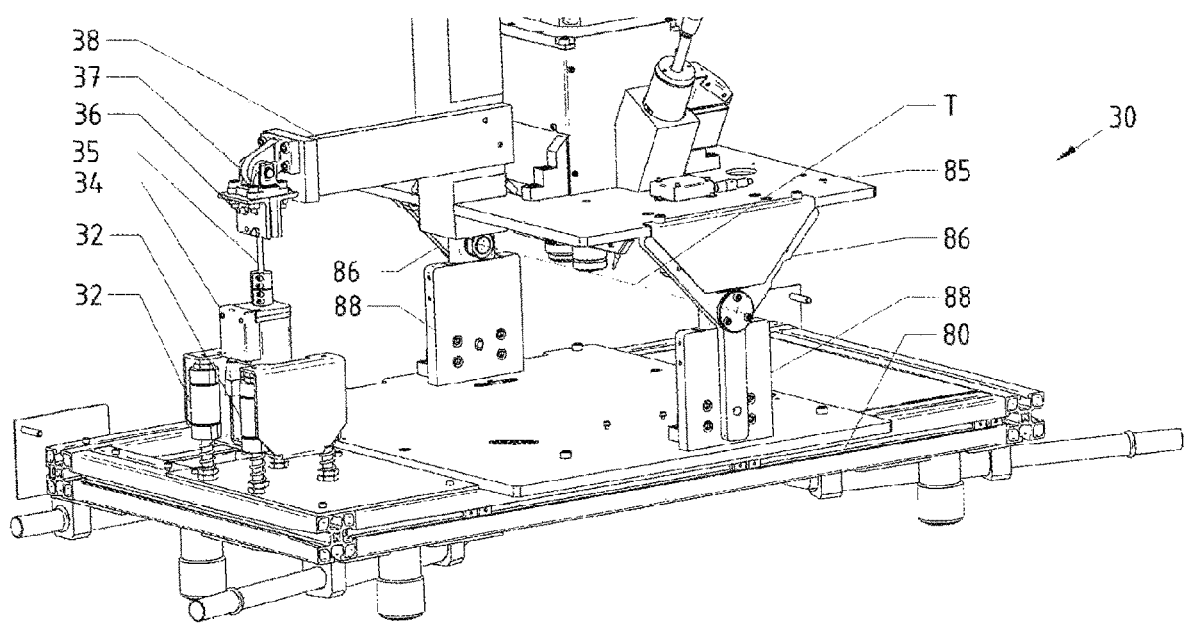
FIG. 4 shows in perspective view an exemplary embodiment of the tilting mechanism, which constitutes a further major component of the slide-digitizing apparatus according to the invention, with the slide handling unit being removed.
Figure 5:
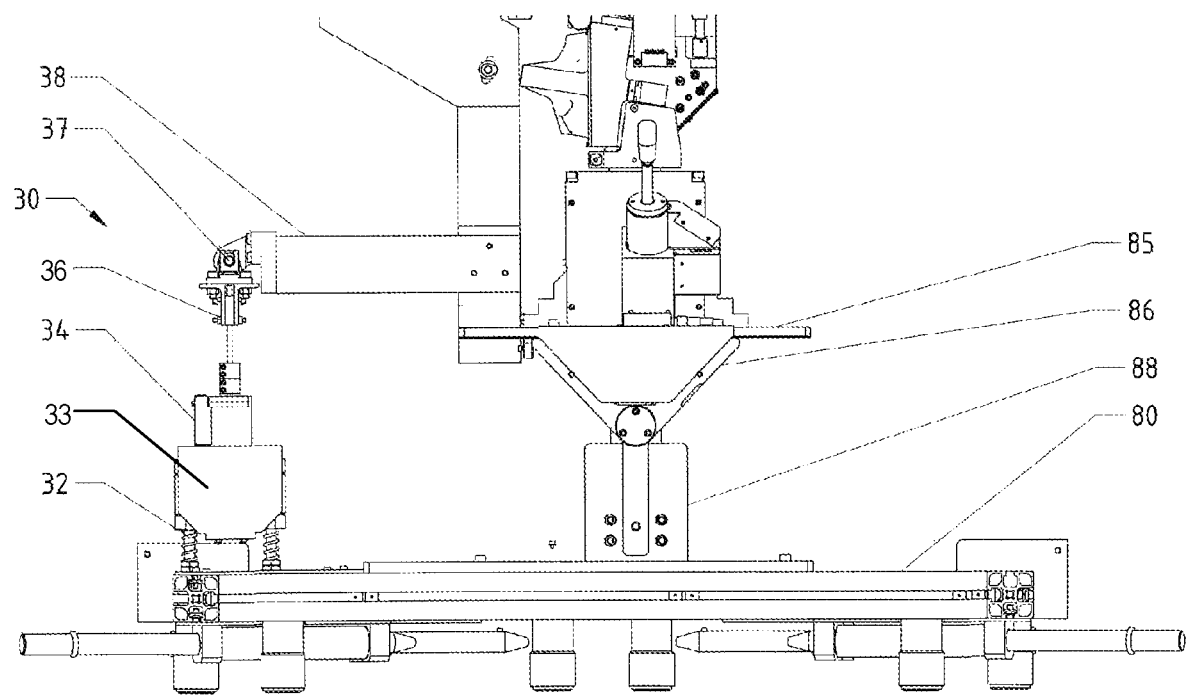
FIG. 5 shows the tilting mechanism of FIG. 4 in side view.

According to the aforementioned, the imaging unit 10 and the light paths forming parts thereof can be positioned in an arbitrary inclination angle relative to vertical as a single unit in order to correct the distortions caused by the inclination of the light modulating element 43. As a result, such images can be recorded about two adjacent sections of the sample that can be continuously stitched in Z direction. Tiltability is provided by the tilting mechanism 30, an exemplary embodiment thereof is shown in FIGS. 4 and 5 in perspective and side views. Accordingly, the imaging unit 10 is mounted on a carrier plate 85 of suitable rigidity. The carrier plate 85 is securely mounted on the table 80 firstly in two opposing regions by one-one console member 86 and one-one vertically extending pillar member 88 in a manner tiltable around a T tilt axis. Each console member 86 is mounted on an end of its respective pillar member 88 in rotatable manner relative to the said pillar member 88. The other end of the pillar members 88 is mounted on the table 80. The console members 86 are preferably connected to their respective pillar members 88 by a pinned connection or a suitable bearing. The T tilt axis coincides with the common geometric axis of the bearings and is substantially in the focal plane of the objective 18 of the imaging unit 10. The position of the focal plane of the objective 18 in the digitizing apparatus according to the present invention is fixed in the Z direction, thus during the generation of images of the different sections—as it is known to a person skilled in the art—the slide 92 (and the sample arranged thereon) is moved relative to the objective 18 in the Z direction in suitable steps by e.g. a stepper motor.

Secondly, the carrier plate 85 is also mounted on the table 80 by a tilting mechanism 30 mounted on the carrier plate 85 in a region substantially perpendicular to region having the console members 86. A preferred embodiment of the tilting mechanism 30 comprises a second (or upper) arm 38, a first (or lower) arm mounted on the arm 38 in a manner rotatable around a pin 37 or by a hinge, a threaded shaft 35 connected to a threaded bore of the arm 36, and a stepper motor 34 connected to the threaded shaft 35 configured for rotating it around a longitudinal axis thereof. In this embodiment, the tilting mechanism 30 is mounted on the table 80 through the housing of the stepper motor 34.

Tiltability of the imaging unit 10 is provided by the relative rotation of the arms 36, 38 of the tilting mechanism 30. In the normal position of the imaging unit 10 the first arm 36 and the second arm 38 are substantially perpendicular to each other, and thus the optical axis of the imaging unit 10 is vertical in this position. Preferably this angular position also means a null position for the stepper motor 34. Operating the stepper motor 34 to a position different from the null position causes elevation (extension) or lowering (retraction) of the threaded shaft 35. This causes a change in the angle formed by the arms 36, 38, and due to the mechanical connection between the carrier plate 85 and the table 80 it also causes the rotation of the imaging unit 10 around the tilt axis T and relative to the vertical (or relative to the direction perpendicular to the image recording surface of the image recording element of the camera i.e. to the image plane). Consequently the imaging unit 10 and along with it the camera and the image plane attain a tilted position characterized by a certain tilting angle, thus an image sufficiently corrected/compensated regarding inclination is generated on the image plane. The size of tilting angle is adjusted by the stepper motor 34 through a certain extent of movement of the threaded shaft 35 under the control of the electronic and control unit 70 (see FIG. 1) in a manner described earlier.

It is hereby noted, that if the optical axis of the imaging unit 10 and the direction perpendicular to the image plane of the camera form an acute angle, the size of said angle is accordingly taken into consideration by the electronic and control unit 70 (see FIG. 1) when determining the tilting angle of the imaging unit 10 to be set by the tilting mechanism 30 for ensuring continuous fitting of the images obtained from the adjacent sections of the sample in the Z direction.

It is also noted, that the distance of the carrier plate 85 and the table 80 in the Z direction is chosen so, that the slide supplier unit 90 shown in FIG. 1, and the slide handling unit 20 can be arranged between the table 80 and the carrier plate 85.

Based on its external dimensions (approx. 955 mm×568 mm×1019 mm) and total weight (about 100 kg), the confocal slide-digitizing apparatus according to the invention is considered to be a large microscope. In this regard, the imaging unit 10 represents a particularly large weight. Accordingly, in a further embodiment of the tilting mechanism 30, the tilting mechanism 30 is not directly mounted on the table 80, but a suitably configured mechanical dampening unit 33 is interposed between the table 80 and the housing of the stepper motor 34—as shown in FIGS. 4 and 5—in order to reduce or eliminate disadvantages resulting from the large weight (e.g. the presence and/or excessive amplification of strong vibrations, detuning occurring when redeploying the digitizing apparatus, damages of the optical elements caused by mechanical effects, e.g. impacts, vibration potentially occurring during redeployment). Under operating conditions the mechanical dampening unit 33 ensures the secure mounting of the tilting mechanism 30, and maintains threaded connection between the table 80 and the imaging unit 10, while during the relocation of the digitizing apparatus 100, it provides protection as a dampening element against potential external mechanical actions, larger forces acting on the tilting mechanism 30 and/or the imaging unit 10 as a resilient element.

Figure 6:
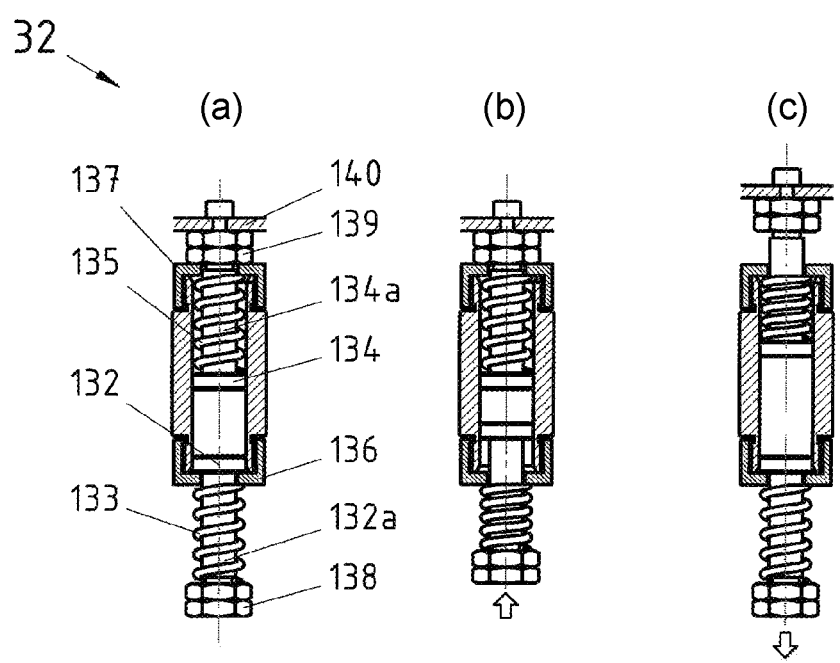
FIG. 6 shows an exemplary embodiment of the impact protection members used in the embodiment of the tilting mechanism shown in FIGS. 4 and 5 in rest state [Figure (a)] and in operation [Figures (b) and (c)]

In a possible embodiment, the mechanical dampening unit 33 according to the invention has a simple construction and a passive configuration without moving parts. The basis of this embodiment of the mechanical dampening unit 33 is the impact protection member 32 shown schematically in FIGS. 4 and 5 and in detail in FIG. 6. The impact protection member 32 is a mechanical element configured to exploit action of spring for dampening mechanical impacts/vibrations/shocks. The impact protection member 32 is configured as a double piston comprising a piston housing 130. A first piston-rod 132a provided with a first piston 132 is placed into the piston housing from one end thereof and a second piston-rod 134a provided with a second piston 134 is placed into the piston housing 130 form the other opposite end thereof; the pistons 132, 134 are separated from each other by a piston space 131. In the case of said embodiment, the piston space 131 is filled with air, but it can also be filled with any other (preferably compressible) media. The piston housing 130 is closed at its two ends by a first 136 and a second 137 end piece configured to have the first piston-rod 132a and the second piston-rod 134a extending therethrough. The end pieces 136, 137 are connected to the piston housing 130 preferably by a releasable joint, e.g. by threaded or snap-lock connection. If there is a medium in the piston space 131 other than air, the end pieces 136, 137 form a tight seals with the corresponding piston-rods 132a, 134a, i.e. the end pieces 136, 137 seal the piston housing 130 in an airtight manner. The ends of the piston-rods 132a, 134a opposite to the pistons 132, 134 have threaded configuration, one or more screw nuts 138, 139 are arranged on the threads. A resilient element 133, 135, preferably a coil spring is disposed on each of the piston-rods 132a, 134a in such manner, that one end of the resilient element 135 abuts on a surface of the end piece 137 facing the piston space 131 (i.e. its inner surface), and its other end abuts on the piston 134, while one end of the other resilient element 133 abuts on the surface of the end piece 136 facing away from the piston space 131 (i.e. its outer surface), while its other end rests on the screw nut 138 as shown in FIG. 6(*a*). The length of the resilient elements 133, 135 is preferably equal to the length of the piston-rods carrying them in resting state, i.e. in the unloaded state of the impact protection member 32, however this is not necessary. Said resilient elements 133, 135 have a given elastic modulus ('spring constant'), thus their bias (compression) and thus the threshold value of the external force causing the operation of the impact protection member 32 can be adjusted by the screw nuts 138, 139.

Due to said configuration, the impact protection member 32 provides a secure mounting during operational conditions (in this case mounted in vertical orientation as a part of the mechanical dampening unit 33 into the tilting mechanism 30 between the carrier plate 85 and the table 80 as illustrated in FIG. 5), while reacts as a spring to an external force in the direction of the piston-rod if this force exceeds the threshold predetermined by the adjustment of the screw nuts, and dampens/absorbs the external force. In particular, if the impact protection member 32 is subjected to a pushing force larger than said threshold moving the pistons 132, 134 towards each other, the piston 132 moves in the direction of piston 134 through the piston space 131 until the resilient element 133 neutralizes this force by its compression (see FIG. 6(*b*)). However, if the impact protection member 32 is subjected to a pulling force larger than said threshold moving the pistons 132, 134 apart from each other, the piston 134 moves in the direction of the end piece 137 until the resilient element 135 neutralizes this force by its compression (see FIG. 6(*c*)).

The mechanical dampening unit 33 comprises at least one of the described impact protection members. Protection of the imaging unit 10 against external actions may be increased by simultaneously using multiple impact protection members 32 in the mechanical dampening unit 33. In the case of solutions according to the inventions, the mechanical dampening unit 33 comprises preferably at least two, more preferably three, even more preferably four impact protection members 32, preferably in a symmetrical arrangement, mounted on a common base 140 (see FIG. 6(*a*)). In such an embodiment, the housing of the stepper motor 34 is mounted on said common base 140.

It is obvious to a person skilled in the art, that the mechanical dampening unit 33 may also be configured as different mechanical structures keeping in sight the protection of the imaging unit 10 from external actions. However its embodiment with the previously described impact protection member is particularly advantageous due to its efficiency, fine tuneability, durability (it is free of moving-and/or wearing parts) and simple construction.

Figure 7:
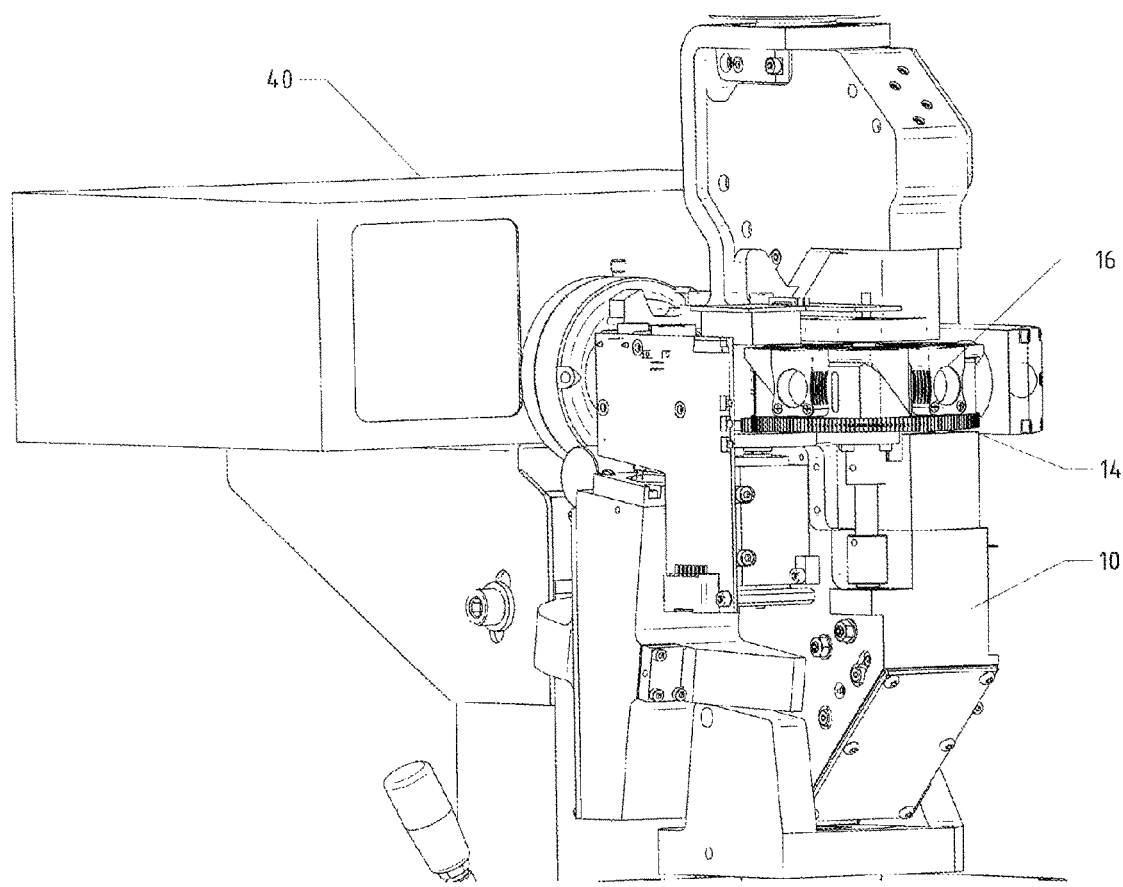
FIG. 7 is a perspective view of a preferred exemplary embodiment of the confocal unit which is a part of the slide-digitizing apparatus according to the invention implemented with filter cubes.
Figure 8:
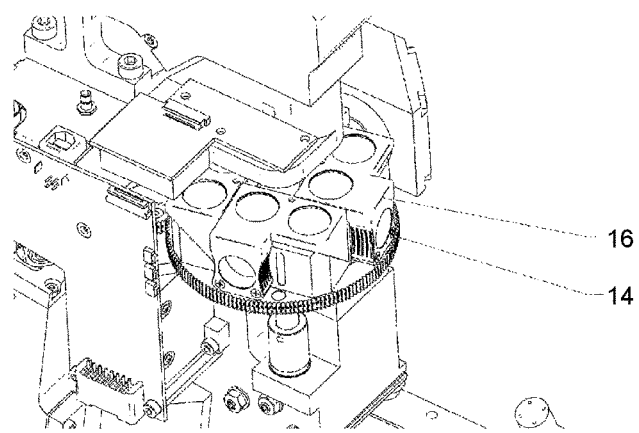
FIG. 8 is an enlarged perspective view of the confocal unit illustrated in FIG. 7, where filter cubes used in the confocal unit that may be disposed in the light path are well visible.
Figure 9:
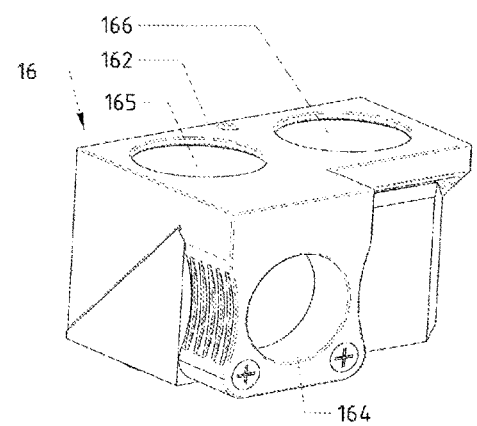
FIG. 9 is a perspective view of an exemplary embodiment of the filter cube that can preferably be used in the slide-digitizing apparatus according to the invention.

Due to the LED light source 40 used in the confocal slide-digitizing apparatus 100 according to the invention for multichannel digitizing, multiband filter may be used, by which idle time caused by switching filters during digitization may be spared (ruled out?). In a preferred embodiment of the digitizing apparatus 100 according to the invention, the multiband filter is provided as filter elements 16 that may be disposed in the light path formed in the imaging unit 10 as shown in FIGS. 7 and 8. In particular, the multiband filter is formed by one or more filter elements 16 arranged on a disc 14 in a suitable geometry, where each of the filter elements 16 transmits light only in a corresponding well defined wavelength range. The rotation of the disc 14 around an axis perpendicular to the plane of the disc 14 and thus placement ('rotation') of the desired/required filter element 16 into the light path is carried out by a stepper motor not shown on the drawings under the supervision of the electronic and control unit 70. According to FIG. 9, each filter element 16 used in the multiband filter is a filter cube, which has a housing 162, an illumination opening 164 allowing the illuminating light emitted by the light source to pass through the filter cube, and light transmitting openings 165, 166 allowing partial beams (see FIG. 3) arriving back from the sample to be imaged to pass through the filter cube. Filtering is carried out by optical elements known to a person skilled in the art arranged in the housing 162 of the filter element 16.

Figure 10:
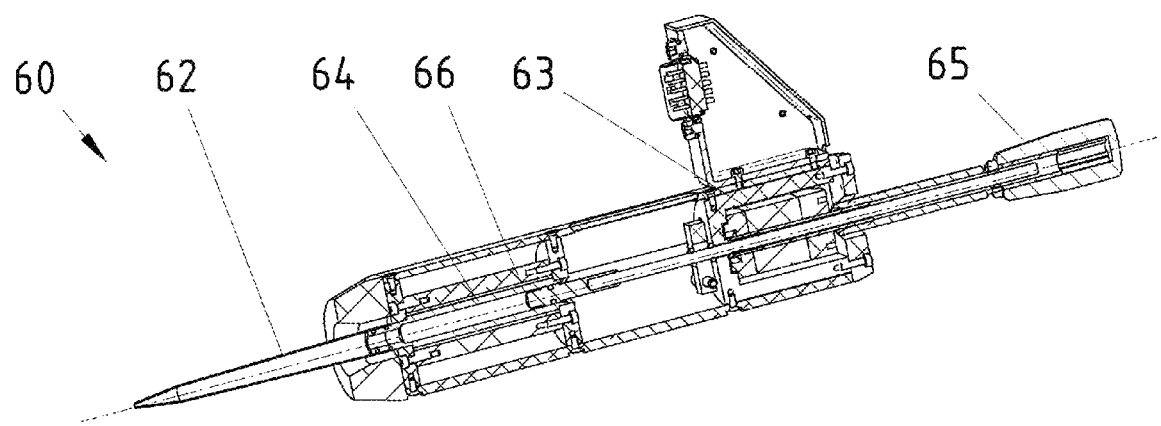
FIG. 10 is the perspective view of the pipetting unit used in a preferred embodiment of the slide-digitizing apparatus according to the invention in a position removed from the digitizing apparatus.

As known, the best possible resolution can be achieved in an optical microscope if the difference between the refractive indices on the light path of the light entering the microscope are minimal. In the digitizing apparatus 100 according to the invention, for minimizing the difference of refractive indices between the lens and the slide, a liquid immersion objective 18 is used with a numeric aperture of at least between 1.2 and 1.4, which is suitable to maximize the numeric aperture/light transmission. As histological sections may be made by both paraffinic and frozen methods, different immersion liquid will be ideal for these two cases. The technology elaborated by us provides the supply of immersion liquid even for digitizations lasting several hours. To this end, we have implemented liquid delivery system in the form of the pipetting unit 60 illustrated in FIG. 10, which allows the user to easily and cost-efficiently switch the immersion liquid. The pipetting unit 60 can be removed from the digitizing apparatus 100 with a single action, and when used one liquid can be swapped to the other without contamination by replacing the pipette tip 62 (this contains the actually used immersion liquid). Thus the two immersion liquids widely used in microscopy (e.g. water and silicone oil) do not come into contact neither with each other, nor with other parts of the pipetting unit 60, e.g. the piston 66, crank 65, work cylinder 64 and stepper motor 63 as shown in FIG. 10. The suitable rate and required movement of the piston 66 is ensured by the stepper motor 63 under the supervision of the electronic and control unit 70, thus on the basis of the step count of the stepper motor 63, the amount of immersion liquid still present in the pipette tip (and the consumed amount) can be precisely tracked.

Recording fluorescent images requires monochrome, recording transmitted light images requires colored images. If the two images are to be brought into overlap with a single pixel accuracy, physically a single camera 50 has to be used for recording both images. In the case of using a colored camera, good fluorescent resolution and quantum efficiency has to be sacrificed. In the light of the above, we have decided to use a monochrome camera in the digitizing apparatus 100 according to the invention; for generating a colored image of the sample, monochrome images are recorded subsequently using the same light path by using blue, green and red illumination, which completely correspond to components of the colored image (R-G-B). The thus obtained colored image is colored from pixel to pixel, where every single pixel comprises the complete color information. In order to achieve the best color fidelity, in the aforementioned filter elements 16, not colored light sources or color filters are used, but broad spectra white LEDs' color channels separated by dichroic mirrors. The lowest possible overlapping between the channels was ensured by using dichroic mirrors, which also provide the best coverage of the given channel. The dichroic (or dichromatic) mirrors used in the solution according to the invention are preferably formed by thin glass plates having vapor deposited metallic films thereon, capable of acting as a mirror against light in a wavelength range lower then a threshold wavelength and reflecting it in a direction other than its original propagation direction, while simply transmitting light with wavelength larger than the threshold wavelength—like a common glass plate.

A unique section-detection method has been used during imaging with the digitization apparatus 100 according to the invention in order to avoid digitizing unnecessary regions. The essence of this is that the continuously moving slide is illuminated in a stroboscope-like manner once for each field of view in conventional fluorescence microscope operational mode, thus the fluorescently active sample region may be precisely mapped in a few minutes. The time-consuming high-resolution confocal scanning is started and carried out based on the thus obtained map according to a given scanning path. A property of confocal imaging is that it requires significantly longer exposition time than fluorescent imaging. Consequently, the precise localization of the sample for skipping "empty" regions is imperative for maximizing the speed of slide-digitizing. The earlier method based on a dark-field preview is not precise enough for this purpose, because contaminations on the slide and preparation artifacts cannot be distinguished from the sample and parts thereof, and due to the differences of the preview camera and the main camera, offsets may occur and thus there is a lot of area marked for digitization unnecessarily. In order to avoid this problem, in the case of the confocal slide-digitizing apparatus according to the invention a pre-scanning optimized for speed is carried out on the path to be used for scanning. The speed-optimized scanning is carried out firstly with stopless, continuous slide movement instead of the stop-and-go slide movement principle, and secondly the most sensitive setting of the camera is used for imaging. The thus obtained image is blurred, and its resolution is also lower than that of the image that could be generated by the digitization carried out in conventional manner. However, because the goal during the operation of digitizing apparatus according to the invention is only to detect and roughly map the empty fields of view, i.e. those that are uninteresting regarding digitization, this does not pose a significant disadvantage in the creation of a preview image, but results in significant time saving.

The invention claimed is:

1. A confocal slide-digitizing apparatus (100), comprising a slide handling unit (20) and a confocal imaging unit (10), said slide handling unit (20) having a slide supplier unit (90) configured to position slides (92) one after the other in an imaging position, individual ones of said slides (92) carrying at least individual samples to be digitized; and said imaging unit (10) having a light source (40) configured to illuminate the sample to be digitized at the imaging position through an objective (18) arranged in a light path that enables confocal imaging of at least a region of the sample, and an image recording unit to receive light with information on at least an illuminated region of the sample through the objective (18) and generate a digital image of a section of a given thickness of said illuminated region, wherein the slide handling unit (20) and the imaging unit (10) are joined mechanically together by a tilting mechanism (3) in a tiltable manner relative to one another to define a tilting angle, thereby correcting the light path of said confocal imaging, wherein the tilting angle is chosen so as to ensure that digital images of two adjacent sections of the sample are capable of being continuously stitched together along a thickness of the sample;

wherein the imaging unit (10) is mounted on a carrier plate (85), the slide handling unit (20) is mounted on a table (80), and the carrier plate (85) and the table (80) are interconnected by the tilting mechanism (30);

wherein the tilting mechanism (30) comprises:

(i) two console members (86) and two pillar members (88), wherein each console member (86) is securely mounted at one end thereof on opposite regions of said carrier plate (85), each pillar member (88) is securely mounted at one end thereof on opposite regions of said table, and wherein the console members (86) and the pillar members (88), in pairs, are joined rotatably to one another at further free ends thereof; and (ii) a second arm (38) mounted securely on the carrier plate (85) in a region of the carrier plate (85) that is substantially perpendicular to a region defined by the regions in which the console members (86) are securely mounted on the carrier plate (85), a first arm (36) joined through a pin (37) pivotably or hingedly to the second arm (38), a threaded shaft (35) being engaged with a threaded bore of the first arm (36), and a stepper motor (34) connected to the threaded shaft (35) to have said threaded shaft rotated (35) around a longitudinal axis, the stepper motor (34) having a housing securely mounted on the table (80).

2. The slide-digitizing apparatus (100) according to claim 1, wherein the mechanical connection ensuring tiltability is provided in the form of a tilting mechanism (30) configured to position the imaging unit (10) around a tilting axis (T) into the tilting angle relative to vertical along with maintaining said light path continuous.

3. The slide-digitizing apparatus (100) according to claim 1, wherein the tilting axis (T) locates substantially within a focal plane of the objective (18).

4. The slide-digitizing apparatus (100) according to claim 1, further comprising an electronic and control unit (70) adapted to determine and adjust the tilting angle required automatically, wherein said electronic and control unit (70) is connected to the stepper motor (34) so as to control the operation of said stepper motor (34).

5. The slide-digitizing apparatus (100) according to claim 1, further comprising a mechanical damping unit (33) interposed between the housing of the stepper motor (34) and the table (80).

6. The slide-digitizing apparatus (100) according to claim 5, wherein the mechanical damping unit (33) comprises at least one impact protection member (32), said impact protection member comprises at least one spring for damping and a double piston configuration.

7. The slide-digitizing apparatus (100) according to claim 1, wherein the objective (18) is a liquid immersion objective.

8. The slide-digitizing apparatus (100) according to claim 7, further comprising a liquid delivery system configured to supply an immersion medium required for an operation of the liquid immersion objective.

9. The slide-digitizing apparatus (100) according to claim 8, wherein the liquid delivery system comprises a pipetting unit (60) which is automated by a stepper motor for dispensing the immersion medium.

10. The slide-digitizing apparatus (100) according to claim 9, wherein the immersion medium is contained in a pipetting tip (62), said pipetting tip forming a replaceable element of the pipetting unit (60).

11. The slide-digitizing apparatus (100) according to claim 1, wherein the image recording unit includes a hardware connection with the light source (40) so as to directly control operation of the light source (40).

12. The slide-digitizing apparatus (100) according to claim 1, wherein the light source comprises at least two light emitting elements illuminating the sample on the slide (92) when the digitization is performed.

13. The slide-digitizing apparatus (100) according to claim 12, wherein the light emitting elements individually emit light at different wavelengths/wavelength ranges from others of the light emitting elements.

14. A tilting mechanism (30) for optical microscopes comprising a slide handling unit (20) and an imaging unit (10) having an objective (18), wherein said imaging unit (10) is mounted on a carrier plate (85), said slide handling unit (20) is mounted on a table (80), and the carrier plate (85) and the table (80) are interconnected by the tilting mechanism (30), wherein the tilting mechanism (3) comprises:

(i) two console members (86) and two pillar members (88), wherein each console member (86) is securely mounted at one end thereof on opposite regions of said carrier plate (85), each pillar member (88) is securely mounted at one end thereof on opposite regions of said table, and wherein the console members (86) and the pillar members (88), in pairs, are joined rotatably to one another at further free ends thereof; and (ii) a second arm (38) mounted securely on the carrier plate (85) in a region of the carrier plate (85) that is substantially perpendicular to a region defined by the regions in which the console members (86) are securely mounted on the carrier plate (85), a first arm (36) joined through a pin (37) pivotably or hingedly to the second arm (38), a threaded shaft (35) being engaged with a threaded bore of the first arm (36), and a stepper motor (34) connected to the threaded shaft (35) to have said threaded shaft rotated (35) around a longitudinal axis, the stepper motor (34) having a housing securely mounted on the table (80).

15. The tilting mechanism (30) according to claim 14, wherein said tilting mechanism (30) is configured to position the imaging unit (10) around a tilting axis (T) into a tilting angle relative to vertical, the tilting axis (T) locating substantially within a focal plane of the objective (18).

* * * * *